United States Patent [19]

Newitt

[11] 3,936,598
[45] Feb. 3, 1976

[54] ELECTRONIC IMAGE DENSITY ANALYSIS

[76] Inventor: John Henry Newitt, 123 Puritan Lane, Sudbury, Mass. 01776

[22] Filed: Feb. 14, 1974

[21] Appl. No.: 442,445

[52] U.S. Cl. ....... 178/6.8; 178/DIG. 1; 178/DIG. 34
[51] Int. Cl.² ..................... H04N 7/02; H04N 7/18
[58] Field of Search ........ 178/DIG. 34, 6.8, DIG. 1; 356/202, 203; 324/77 R, 77 A, 77 B, 77 E

[56] References Cited
UNITED STATES PATENTS

| | | | |
|---|---|---|---|
| 2,851,661 | 9/1958 | Buland | 324/77 E |
| 3,031,525 | 4/1962 | Oniki | 360/31 |
| 3,053,987 | 9/1962 | Cook | 356/203 |
| 3,165,588 | 1/1965 | Campanella | 324/77 B |
| 3,202,042 | 8/1965 | Jamieson | 356/203 |
| 3,213,197 | 10/1965 | Hawkins | 324/77 E |
| 3,283,070 | 11/1966 | Prince | 178/6.8 |
| 3,436,473 | 4/1969 | McMann | 178/DIG. 34 |
| 3,528,749 | 9/1970 | Bowker | 356/202 |
| 3,678,188 | 7/1972 | Okumura | 178/DIG. 34 |
| 3,704,950 | 12/1972 | Rosencranz | 356/202 |
| 3,706,851 | 12/1972 | Froehlich | 178/DIG. 34 |
| 3,728,481 | 4/1973 | Froehlich | 178/DIG. 34 |
| 3,740,457 | 6/1973 | Meeussen | 178/6.7 A |
| 3,790,275 | 2/1974 | Huboi et al. | 356/203 |

Primary Examiner—Howard W. Britton
Assistant Examiner—Michael A. Masinick

[57] ABSTRACT

A television camera provides a video output voltage having an amplitude proportional to an amount of light flux received along a line of sight which traces a raster on a scene. In response to the video output voltage, an antilog amplifier provides an image photodensity voltage having an amplitude proportional to the image density of a point on the scene along the line of sight. The amplitude of the density voltage is compared in a window detector to a pair of window voltages which define a voltage range. The window detector provides first and second voltages in response to the density voltage being respectively within and outside of the voltage range. Selected frequency components of the output of the window detector are provided to a display for displaying a representation of objects of the scene, where the displayed objects have a size within a selected range of sizes and have an image within a selected range of image densities.

9 Claims, 2 Drawing Figures

ELECTRONIC IMAGE DENSITY ANALYSIS

BACKGROUND OF THE INVENTION

1. Field of the Invention

This invention is in the field of image analysis and more particularly is a system for providing a display representative of selected objects of a scene.

2. Description of the Prior Art

To provide a video signal representative of a scene, typically a video source, such as a television camera, has an optical input which receives light flux along a line of sight from a point on the scene. The amount of the light flux is a non-linear function of what is known in the art as an image photo-density of the point. The video signal has an amplitude which is proportional to the amount of the light flux.

Usually, the line of sight successively traces an array of closely, evenly spaced lines across the scene. The lines are traced from left to right at a constant rate.

The array of lines is referred to in the art as a camera raster and each of the lines thereof is referred to as a camera raster line. Typically, a first camera raster line is traced across the topmost portion of the scene and a last camera raster line is traced across the bottom of the scene. After the first camera raster line is traced, the line of sight is rapidly retraced during a horizontal retrace time from right to left to a position slightly below the first camera raster line to trace the next succeeding camera raster line. Other camera raster lines are traced in a similar manner. After the last camera raster line is traced, the line of sight is rapidly retraced during a vertical retrace time to a position to trace the first camera raster line.

Because the camera raster lines are traced at a constant rate, a camera raster line traced on large objects (of substantially uniform image density) of the scene cause infrequent variations in the amplitude of the video signal. Correspondingly, a camera raster line traced on small objects of the scene causes frequent variations in the amplitude of the video signal. Therefore, the video signal has a frequency spectrum of components respectively associated with the sizes of the objects of the scene.

Heretofore, large computers or other large costly apparatus has been used for providing a display representative of sizes and image densities of objects of a scene. A large computer is typically programmed to process representations of predetermined video signals. Accordingly, the large computer is not suitable for providing an on-line (real time) display representative of the sizes and the image densities of the objects.

SUMMARY OF THE INVENTION

An object of the present invention is to provide a display representative of an object of a scene where the object has an image photo-density within a selected range.

Another object of the present invention is to provide a display representative of an object of a scene where the object has a size and a selected range of sizes and an image photo-density within a selected range of image photo-densities.

Another object of the present invention is to provide a display representative of the cumulative distribution function of the sizes of objects of a scene.

According to the present invention, a density signal is proportional to the antilogarithm of the amount of light flux from a scene along a line of sight which traces a raster on said scene; a processed video signal is provided in response to a comparison of the density signal with a known range of density signals whereby said processed video signal has a frequency component associated with an object of said scene, said object having a size within a known range of sizes and having an image photo-density within a known range of image densities.

Apparatus constructed according to the invention economically provides a display of what is referred to as the texture of objects of a scene. The display of the texture is provided by a cathode ray tube which is brightened in accordance with the number of the objects of the scene having a size within a selected range of sizes and an image photo-density within a selected range of image photo-densities. Additionally, there may be provided a display of an image which is representative of the objects having an image density and a size within the respective ranges of image densities and sizes.

The invention may be utilized to provide a display representative of the cumulative distribution of sizes of objects which are within a selected range of image photo-densities.

Other objects, features and advantages of the present invention will become more apparent in the light of the following detailed description of embodiments thereof as illustrated in the accompanying drawing.

DESCRIPTION OF THE PREFERRED EMBODIMENT

Figure 1:
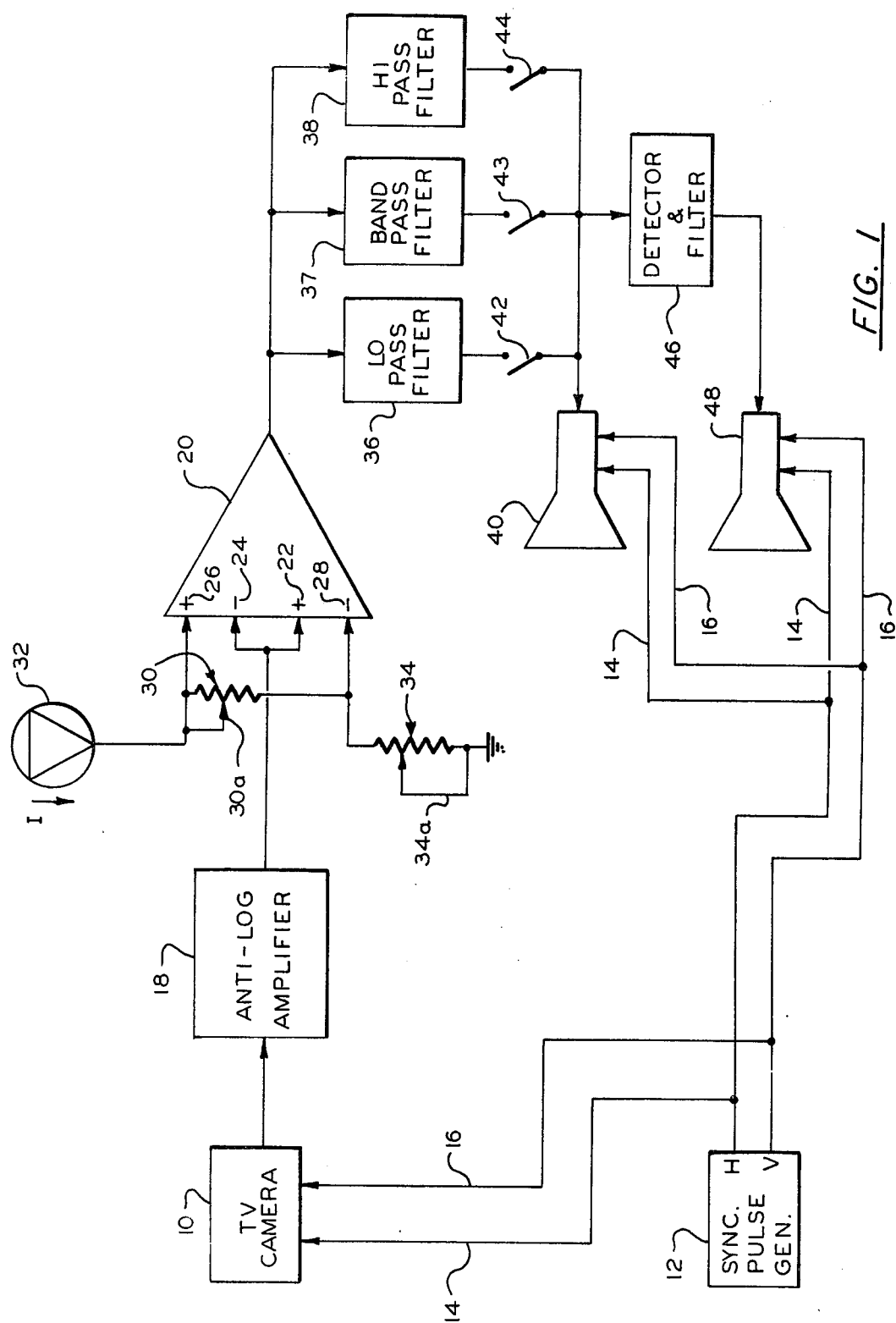
FIG. 1 is a schematic block diagram of a first embodiment of the present invention.

Referring now to FIG. 1, in each of two embodiments of the present invention, a television camera 10 has an optical input which receives light flux along a line of sight from a scene (not shown). The camera 10 provides a video output voltage having an amplitude proportional to the amount of the light flux.

The camera 10 additionally receives horizontal and vertical synch pulses from a synch pulse generator 12 through signal lines 14, 16, respectively. In response to a vertical synch pulse, the line of sight traces a camera raster, each camera raster line being provided in response to a horizontal synch pulse. The output of the camera 10 is connected to an antilog amplifier 18 at an input thereof whereby the video output voltage is provided to the amplifier 18.

It is well known that the amount of the light flux is proportional to the logarithm of the value of an image photo-density of the scene along the line of sight. Accordingly, the amplitude of the video output voltage is proportional to the logarithm of the image density of the scene along the line of sight.

The output of the amplifier 18 is a voltage (referred to as a density voltage) having an amplitude proportional to a base number raised to an exponent. The exponent is proportional to the magnitude of the video output voltage. Accordingly, the amplitude of the density voltage is proportional to an antilogarithm of the magnitude of the video output voltage. Therefore, the amplitude of the density voltage is proportional to the image density of the scene along the line of sight.

The output of the amplifier 18 is connected to a window detector 20 at a first inverting input 22 and a first non-inverting input 24 whereby the density voltage is provided to the window detector 20.

The window detector 20 has a second inverting input 26 and a second non-inverting input 28 where a first window voltage and a second window voltage (less positive than the first window voltage) are respectively applied. A voltage less positive than the first window voltage and more positive than the second window voltage is said to be within the window of the window detector 20. In accordance with the explanation given hereinbefore, the window corresponds to a range of image densities.

In response to the density voltage being within the window, the window detector 20 provides a processed video voltage which is approximately five volts. In response to the density voltage not being within the window, the processed video voltage is approximately zero volts. Window detectors of the type described hereinbefore are well known to those skilled in the art.

The inputs 26, 28 are connected together through a potentiometer 30. Additionally, the inputs 26, 28 are respectively connected to a constant current source 32 and to ground through a potentiometer 34. The source 32 provides a constant D.C. current which flows through the potentiometers 30, 34 (because substantially no current flows to or from the inputs 26, 28). Constant current sources, which are well known in the art, are typically a simple circuit comprised of a transistor.

The potentiometers 30, 34 have wiper arms 30a, 34a respectively connected to ground and to the source 32. Accordingly, the wiper arms 30a, 34a, are operable to increase and decrease the resistance of the potentiometers 30, 34.

Since the current flowing through the potentiometers 30, 34 is constant, the second window voltage equals the product of the constant current and the resistance of the potentiometer 34. Applying well known circuit theory, the first window voltage equals the sum of the second window voltage and the product of the constant current and the resistance of the potentiometer 30.

Because transitions of the density voltage into and out of the window causes transitions of the processed video voltage from five volts to zero volts, respectively, the frequency of the processed video voltage is indicative of the size of objects of the scene which are within a selected range of image densities (corresponding to the window). In accordance with the explanation given hereinbefore, the processed video voltage is provided in response to a comparison of the density voltage with the window.

The output of the window detector 20 is connected to a low pass filter 36, a band pass filter 37 and a high pass filter 38 at inputs thereof. In a first embodiment of the present invention, the filters 36–38 have outputs connected to the video input of a first CRT display 40 through switches 42–44, respectively. Accordingly, the processed video voltage may be selectively provided to the display 40 through the filters 36–38. The display 40 includes a CRT having a beam at a location of the face thereof, the brightness of the CRT beam being proportional to the amplitude of the processed video voltage provided to the display 40.

The display 40 has horizontal and vertical synch inputs connected to the generator 12 through the lines 14, 16, respectively. In response to the synch pulses, the CRT beam traces an array of closely evenly spaced lines referred to as a viewing raster. It should be understood that because the generator 12 provides synch pulses to the camera 10 and the display 40, the lines of the viewing raster respectively correspond to the camera raster lines. The display 40 includes what is known as a blanking circuit for reducing the brightness of the CRT beam during the horizontal and the vertical retrace times.

In response to a closure of the switch 42, the processed video voltage is provided through the low pass filter 36 to the display 40. The filter 36 passes low frequency components of the processed video voltage whereby an image provided by the display 40 is representative of the largest objects having an image density within the range corresponding to the window described hereinbefore.

In response to a closure of the switch 43 the processed video voltage is provided through the bandpass filter 37 to the display 40. The filter 37 passes intermediate frequency components of the processed video voltage whereby the image is representative of medium sized objects having an image density within the range corresponding to the window.

Similarly, in response to a closure of the switch 44 the processed video voltage is provided through the high pass filter 38 to the display 40. The filter 38 passes high frequency components of the processed video voltage whereby the image is representative of small objects having an image density within the range corresponding to the window.

It should be understood that in alternative embodiments any number of filters of respectively different bandpass characteristics may be provided.

Additionally connected to the switches 42–44 is the input of a detector and filter circuit 46 whereby the processed video voltage is selectively provided through the filters 36–38 via the switches 42–44, respectively, to the detector and filter circuit 46.

The detector and filter circuit 46 is a well known type of circuit which provides a D.C. voltage (referred to as a texture voltage hereinafter) proportional to the amplitude of the processed video voltage.

The output of the detector and filter circuit 46 is connected to a second CRT display 48 (similar to the display 40) at a video input thereof. The display 48 has horizontal and vertical synch inputs connected to the generator 12 through the lines 14, 16, respectively, whereby the horizontal and the vertical synch pulses are provided to the display 48.

Because the texture voltage is substantially constant, the display 48 provides on the face of a CRT thereof a substantially uniform brightness proportional to the number of either large, medium sized or small objects having a selected density range. It should be understood that the size of the objects is in accordance with closure of the switches 42–44 described hereinbefore.

Thus there has been shown apparatus for providing displays representative of objects within a selected range of sizes and within a selected range of image densities.

Figure 2:
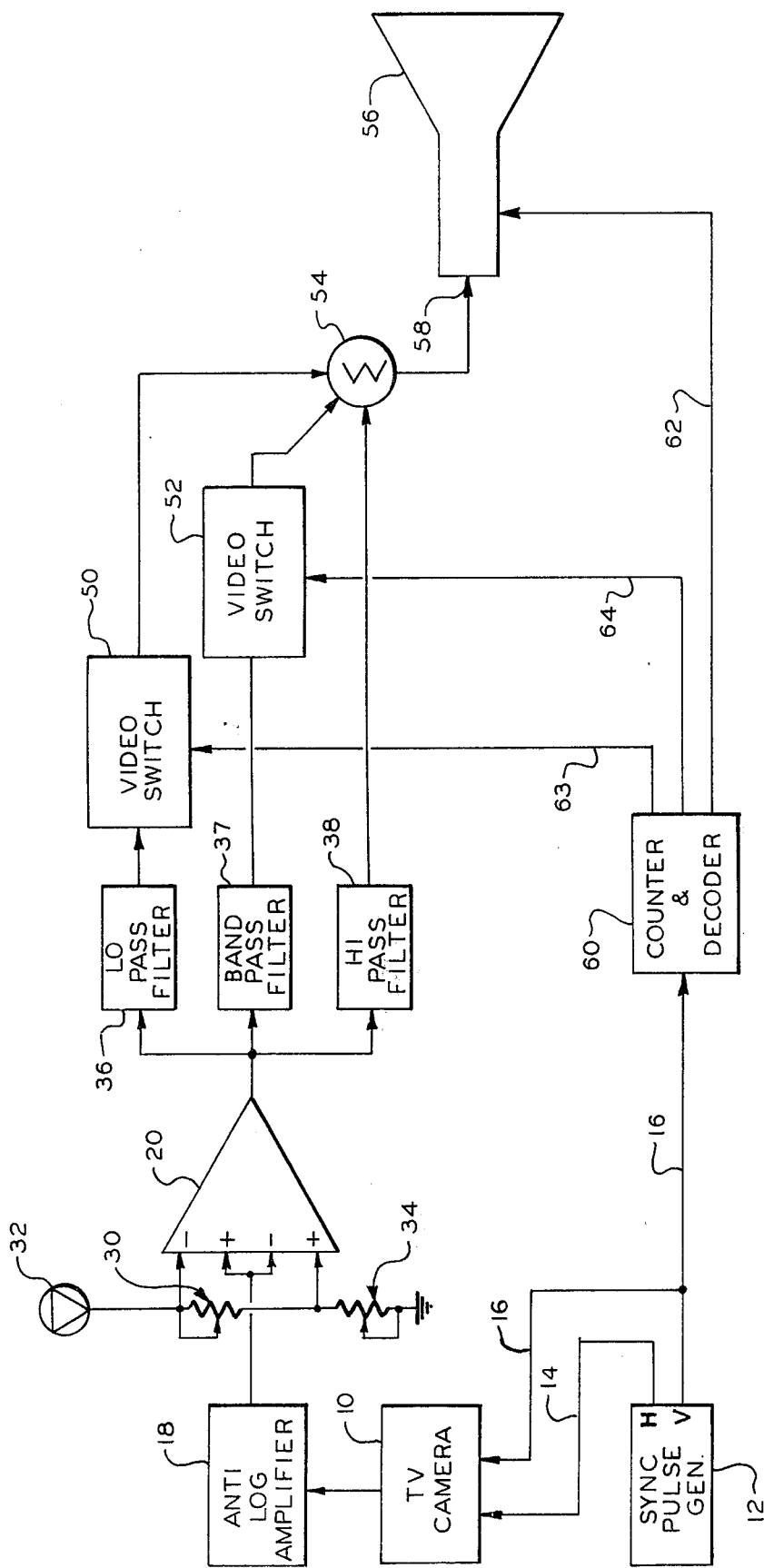
FIG. 2 is a schematic block diagram of a second embodiment of the present invention.

Referring now to FIG. 2, in a second embodiment of the present invention, the filters 36, 37 are respectively connected through video switches 50, 52 to a summing network 54 at first and second inputs thereof. The output of the filter 38 is connected to the network 54 at a third input thereof.

The network 54 provides an output voltage proportional to the sum of input voltages provided thereto. The switches 50, 52 are of the type which has a control input where approximately three volts and zero volts is provided to respectively cause a switch closure and a switch opening. It should be understood that during a closure of one of the switches 50, 52 the processed video voltage is provided through the closed switch to the network 54; the processed video voltage is not provided through an open switch.

The output of the network 54 is connected to an oscilloscope 56 at a vertical input 58 thereof. The oscilloscope 56 has a CRT whereon a beam is swept from left to right during a sweep time in response to a trigger signal being provided to the oscilloscope 56. In this embodiment, the sweep time substantially equals the time for tracing three camera rasters. During a sweep time, the beam of the oscilloscope 56 is vertically deflected from a datum line in proportion to a voltage provided to the input 58.

A trigger input of the oscilloscope 56 is connected to a first output of a counter and decoder circuit 60 through a signal line 62. Second and third outputs of the counter and decoder are connected to the switches 50, 52 at control inputs thereof through signal lines 63, 64, respectively.

The counter and decoder circuit 60 has an input connected to the generator 12 through the line 16 whereby vertical synch pulses are provided to the counter and decoder circuit 60.

In response to a first vertical synch pulse, the counter and decoder 60 provides approximately three volts on the line 62 whereby a trigger signal is provided to the oscilloscope 56 and a sweep is initiated as described hereinbefore. Concurrently with the provision of the trigger signal, zero volts is provided on the lines 63, 64.

Since the output of the filter 38 is connected to the network 54, when the sweep is initiated the processed video voltage is provided through the filter 38 to the network 54. Because zero volts is provided on the lines 63, 64, the processed video voltage is not provided through the switches 50, 52 to the network 54.

Accordingly, after the first vertical synch pulse, the vertical deflection of the beam of the oscilloscope 56 is in response to the line of sight being traced across a small object having an image density within the range corresponding to the window.

In response to a second vertical synch pulse (when one third of the sweep is completed), the counter and decoder circuit 60 provides approximately three volts on the line 63 whereby the processed video voltage is provided through filters 36, 38 to the network 54. Accordingly, after the second vertical synch pulse the vertical deflection of the beam of the oscilloscope 56 is in response to the line of sight being traced across either a small object or a large object having an image density within the range corresponding to the window.

In response to a third vertical synch pulse (when two-thirds of the sweep is completed) the counter and decoder circuit 60 concurrently provides three volts on the lines 63, 64 whereby the processed video voltage is concurrently provided through the filters 36–38 to the network 54. Accordingly, after the third vertical synch pulse the vertical deflection of the beam of the oscilloscope 56 is in response to the line of sight being traced across objects of either small, large or medium size having an image density within the range corresponding to the range of the window. The counter and decoder circuit 60 is of a type well known in the art.

In response to a successive vertical synch pulse, the trigger signal is provided on the line 62 and zero volts is provided on the lines 63, 64 whereby a successive sweep is initiated as described hereinbefore.

It should be appreciated that the display provided by the oscilloscope 56 corresponds to a cumulative distribution function of the sizes of the objects of the scene having an image density within a range corresponding to the window. Cumulative distribution functions are well known in the science of statistics.

Thus there has been shown apparatus for providing a display corresponding to a cumulative distribution function of the size of objects of a scene, where the objects have an image density within a range corresponding to the window.

Although the invention has been shown and described with respect to a preferred embodiment thereof, it should be understood by those skilled in the art that various changes and omissions in the form and detail thereof may be provided therein without departing from the spirit and the scope of the invention.

Having thus described typical embodiments of my invention, that which I claim as new and desire to secure by letters patent of the United States is:

1. In the method of providing a display representative of objects of a scene where a video source provides a camera video signal having an amplitude proportional to an amount of light flux from said scene along a line of sight which traces a raster on said scene, the steps of:
   providing a density signal having an amplitude proportional to the antilogarithm of the amplitude of said camera video signal;
   comparing said density signal with a known range of density signals and providing a processed video signal having first and second amplitudes in response to said density signal being respectively within and outside of said known range; and
   displaying an image in response to selected frequency components of said processed video signal.

2. The method of claim 1 wherein the step of displaying includes the steps of:
   providing a display of a beam swept horizontally across the face of an oscilloscope during a sweep time; and
   deflecting said beam vertically in proportion to the amplitude of a first selected frequency component of said processed video signal during a first portion of said sweep time and in proportion to the sum of the amplitudes of said first frequency component and a second selected frequency component during a second portion of said sweep time.

3. The method of claim 1 wherein said step of displaying includes the step of filtering said processed video signal to provide said selected frequency components.

4. The method of claim 3 additionally including the step of detecting and filtering said selected frequency components to provide a D.C. signal having an amplitude proportional to the amplitude of said selected frequency components.

5. Apparatus for providing a display representative of objects of a scene where an image source provides a camera video signal having an amplitude proportional of an amount of light flux from said scene along a line of sight which traces a raster on said scene, comprising:

an antilogarithm amplifier connected to said image source for providing a density signal proportional to the antilogarithm of the amplitude of said camera video signal;

a window detector connected to said antilogarithm amplifier for comparing said density signal to a known range of density signals, said window amplifier providing a processed video signal having first and second amplitudes in response to said density signal being respectively within and outside of said known range; and display means connected to said window detector for displaying an image in response to a selected frequency component of said processed video signal.

6. Apparatus according to claim 5 wherein said display means comprises:

a filter connected to said window detector for providing said selected frequency component.

7. Apparatus according to claim 6 further comprising a detector and filter circuit for providing a D.C. signal having an amplitude proportional to the amplitude of said selected frequency component.

8. Apparatus according to claim 5 wherein said display means comprises an oscilloscope having a beam swept horizontally across the face thereof during a sweep time, said beam being vertically deflected in proportion to the amplitude of said selected frequency component.

9. Apparatus according to claim 8 additionally comprising:

a plurality of filters of respectively different bandwidths, each of said filters having an input connected to said window detector whereby said processed video signal is provided to said filters;

switching means operable to provide outputs of desired ones of said filters during portions of said sweep time; and summing means connected to said switching means and said oscilloscope for vertically deflecting said beam in response to the sum of the amplitude of the signals provided by the desired ones of said filters.

* * * * *